Jan. 14, 1958  W. F. ASHWORTH  2,819,506
FASTENING DEVICE
Filed Sept. 24, 1953

INVENTOR:
WINTHROP F. ASHWORTH,
BY Robert E. Ross
ATTORNEY.

2,819,506

FASTENING DEVICE

Winthrop F. Ashworth, Wenham, Mass., assignor, by mesne assignments, to United-Carr Fastener Corporation, Boston, Mass., a corporation of Delaware Application September 24, 1953, Serial No. 382,103

1 Claim. (Cl. 24—218)

This invention relates generally to fastening devices and has particular reference to a snap fastener socket member of the three-side-lock type.

Previously known snap fastener sockets of this general type, in which an expansible spring is encased in a housing to receive a shouldered stud, have been found to have a serious disadvantage, particularly when used on military clothing and military equipment, in that when such fasteners become coated or impregnated with dirt, mud, sand, or the like, they are rendered inoperative. This is particularly troublesome when a stud and socket assembly becomes coated or saturated with wet mud which is allowed to dry. In such cases, it has been found impossible to unsnap the stud from the socket, due to the mud which becomes lodged between the spring and the casing, preventing the expansion of the spring necessary to permit it to pass over the head of the stud.

The object of this invention is to provide a snap fastener socket which is not rendered inoperative by the presence therein of mud, sand or the like.

A further object of the invention is to provide a snap fastener socket in which a socket body is provided with a stud-engaging tongue formed in one side, with means disposed about the exterior of the socket for biasing the tongue into engagement with the socket.

Other objects of the invention will, in part, be obvious, and will, in part, appear hereinafter.

Figure 1:
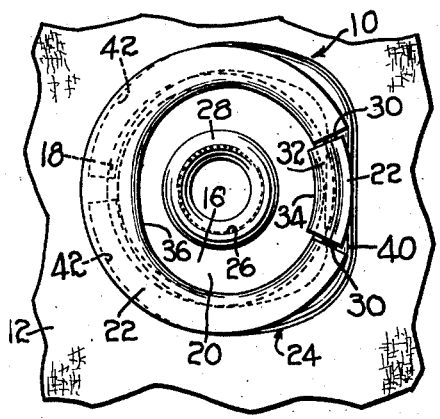
Fig. 1 is a top plan view of a socket member embodying the features of the invention.
Figure 2:
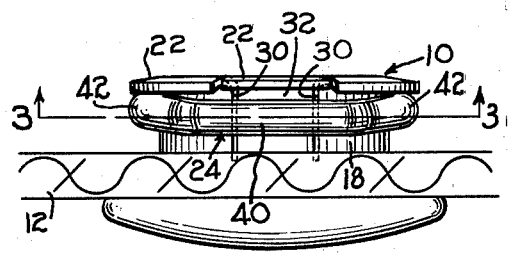
Fig. 2 is a view of the socket member of Fig. 1 as seen from the right side.

Referring to the drawing, there is illustrated a snap fastener socket 10 for attachment to a supporting sheet 12 to receive and engage a shouldered stud 14.

The socket 10 is of the three-side-lock type, that is, the stud may be disengaged from the socket only by a separating force applied to one predetermined side of the assembly. The socket 10 comprises generally a hollow cup-shaped body formed by a base 16, an upstanding peripheral wall 18 disposed on the base forming a generally cylindrical stud-receiving cavity 20, an outwardly turned flange 22 disposed at the upper end of the wall 18, and a split ring spring member 24 disposed about the wall below the flange.

The base 16 is provided with a central opening 26 to enable the socket to be attached to the sheet 12 by means of a capped rivet 28.

To provide means to enable the socket to receive the stud in snapping engagement, a pair of vertical slots 30 are provided in the wall 18, forming a vertical tongue 32 which is provided with an inwardly projecting stud-engaging shoulder 34 disposed near the upper end.

Figure 3:
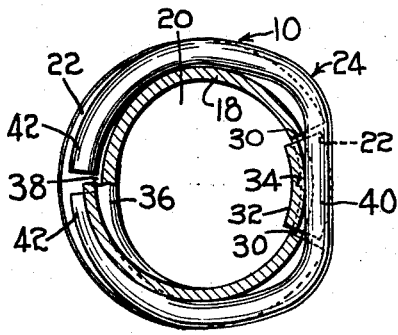
Fig. 3 is a view in section taken on line 3—3 of Fig. 2.
Figure 4:
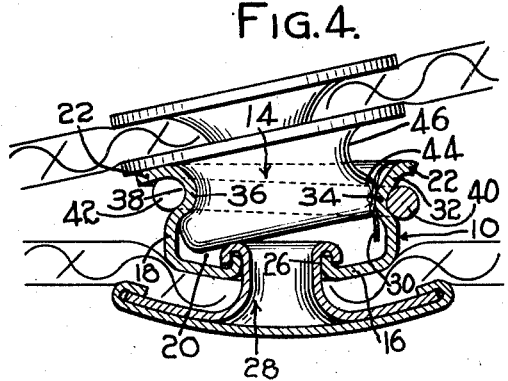
Fig. 4 is a view in section of the socket illustrating the action thereof during assembly of a stud.
Figure 5:
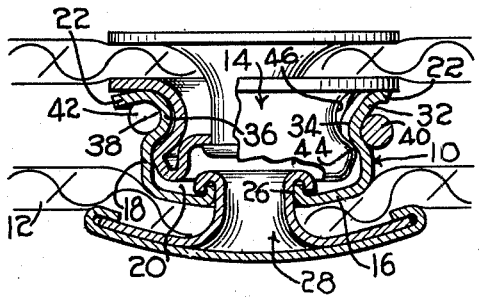
Fig. 5 is a view in section of the socket with a stud assembled therein.

To impart a three-side-lock feature to the socket, a portion of the socket wall 18 on the side opposite the slot is embossed inwardly in spaced relation to the base to form an inwardly rounded stud-locking portion 36 which projects into the stud cavity 20, and extends an appreciable distance circumferentially, merging gradually into the socket wall, as is best illustrated in Figs. 1 and 3. The forming of the stud-locking portion 36 provides an exterior recess 38.

The split ring spring 24 is disposed about the exterior of the wall, with a substantially straight medial portion 40 bearing against the outer surface of the tongue 32 and end portions 42 encircling the wall and terminating in the exterior recess 38. The medial portion of the spring thereby biases the stud-engaging tongue inwardly into the stud-receiving cavity.

The flange 22 at the upper end of the wall 18 extends over the spring to provide an improved appearance to the socket end to insure that the spring is retained on the socket.

The stud 14 is provided with a shoulder 44 and a reduced neck 46 which has a concave outer periphery to generally conform to the shape of the stud-locking portion 36.

The stud is assembled into the socket by tilting the stud to insert the shoulder under the stud-locking portion and then pushing the other side of the stud into the socket so that the stud shoulder snaps past the shoulder 34 on the tongue by forcing the tongue outwardly against the pressure of the spring.

The mudproof characteristic of the socket is imparted by the fact that the spring is exposed about its periphery so that outward movement of the medial portion and the tongue to permit the head of the stud to pass therethrough cannot be obstructed by the presence of mud or the like so that jamming of the stud in the socket is impossible.

The illustrated fastener has other advantages apart from its mudproof characteristics. The construction of the spring imparts a uniform action to the fastener, since the spring is always disposed in the same orientation in relation to the unlocking side of the socket. The stud does not engage the spring directly but engages the tongue, and since the tongue conforms more closely to the shape of the stud than the spring, wear on the stud is greatly reduced.

Since certain other obvious modifications may be made in the device without departing from the scope of the invention, it is intended that all matter contained herein be interpreted in an illustrative and not in a limiting sense.

I claim:

A three-side lock snap fastener socket for receiving a shouldered stud, comprising a cup-shaped socket body having a base, an upstanding peripheral wall on the base forming a stud-receiving cavity, an outwardly turned flange on said wall spaced from the base, said wall having a rigid stud-locking shoulder adjacent to the flange and projecting into the cavity on one side of the socket and a pair of vertical slots in the wall and extending entirely through the flange at the opposite side of the socket from the locking shoulder thereby forming a vertically extending single tongue between the slots and opposite the stud-locking shoulder, said tongue having an inwardly extending stud engaging shoulder and being movable out of and into the stud-receiving cavity and a spring member disposed about the exterior of the socket wall and having a portion bearing against the exterior of the tongue to bias said tongue inwardly a predetermined amount and to prevent said tongue from becoming set during engagement with and disengagement from a stud.

References Cited in the file of this patent

UNITED STATES PATENTS

| | | |
|---|---|---|
| 1,208,601 | Manahan | Dec. 12, 1916 |
| 1,278,799 | Carr | Sept. 10, 1918 |
| 1,300,573 | Carr | Apr. 15, 1919 |
| 1,598,691 | Powell | Sept. 7, 1926 |
| 2,470,740 | Fenton | May 17, 1949 |
| 2,767,454 | Johnson | Oct. 23, 1956 |

FOREIGN PATENTS

| | | |
|---|---|---|
| 71,634 | Austria | Apr. 25, 1916 |